US010339878B2

(12) United States Patent
Chen

(10) Patent No.: US 10,339,878 B2
(45) Date of Patent: Jul. 2, 2019

(54) WHITE BALANCE ADJUSTMENT METHODS AND SYSTEMS FOR DISPLAY DEVICES

(71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 243 days.

(21) Appl. No.: 15/128,986

(22) PCT Filed: Aug. 4, 2016

(86) PCT No.: PCT/CN2016/093188
§ 371 (c)(1),
(2) Date: Sep. 25, 2016

(87) PCT Pub. No.: WO2018/014376
PCT Pub. Date: Jan. 25, 2018

(65) Prior Publication Data
US 2018/0240415 A1    Aug. 23, 2018

(30) Foreign Application Priority Data

Jul. 20, 2016   (CN) .......................... 2016 1 0572881

(51) Int. Cl.
*G09G 3/36* (2006.01)
*H04N 5/202* (2006.01)
*H04N 9/64* (2006.01)

(52) U.S. Cl.
CPC ........... *G09G 3/3607* (2013.01); *H04N 5/202* (2013.01); *H04N 9/643* (2013.01);
(Continued)

(58) Field of Classification Search
CPC ........ H04N 9/3182; H04N 9/73; H04N 9/735; G09G 1/00–2380/16
See application file for complete search history.

(56) References Cited

U.S. PATENT DOCUMENTS 5,570,129 A * 10/1996 Hafele .................... H04N 9/73
348/223.1
6,573,932 B1 * 6/2003 Adams, Jr. ........... H04N 1/6086
348/223.1

(Continued)

Primary Examiner — Gene W Lee
(74) Attorney, Agent, or Firm — Andrew C. Cheng

(57) ABSTRACT

The present disclosure relates to a white balance adjustment method and system. The method includes: obtaining initial white balance components of each of grayscales respectively for red pixels, green pixels, and blue pixels; obtaining a first relationship curve by fitting the white balance component of the red pixel with the green pixel, and obtaining a second relationship curve by fitting the white balance component of the blue pixel with the green pixel; calculating the adjusted white balance component of the green pixel after the GAMMA voltage is adjusted; substituting the adjusted white balance component of the green pixel into the first relationship curve and the second relationship curve to respectively obtain the adjusted white balance components of the red pixel and the blue pixel; and creating a second white balance look-up table according to the adjusted white balance components of the red pixels, the green pixels, and blue pixels.

9 Claims, 4 Drawing Sheets

(52) U.S. Cl.
CPC ............ *G09G 2310/027* (2013.01); *G09G 2320/0276* (2013.01); *G09G 2320/0666* (2013.01); *G09G 2320/0673* (2013.01)

(56) References Cited

U.S. PATENT DOCUMENTS

| | | | | |
|---|---|---|---|---|
| 7,623,160 B2* | 11/2009 | Chino | ............... | H04N 9/735 348/223.1 |
| 9,137,455 B1* | 9/2015 | Rivard | ............... | H04N 5/2355 |
| 9,154,708 B1* | 10/2015 | Rivard | ............... | H04N 5/2352 |
| 9,160,936 B1* | 10/2015 | Rivard | ............... | H04N 5/2355 |
| 9,167,169 B1* | 10/2015 | Rivard | ............... | H04N 5/2355 |
| 9,167,174 B1* | 10/2015 | Rivard | ............... | H04N 5/2355 |
| 9,179,062 B1* | 11/2015 | Rivard | ............... | H04N 5/2256 |
| 9,179,085 B1* | 11/2015 | Rivard | ............... | H04N 5/3745 |
| 9,218,662 B1* | 12/2015 | Feder | ............... | G06T 5/00 |
| 2001/0045988 A1* | 11/2001 | Yamauchi | ............... | G06T 1/60 348/273 |
| 2002/0012054 A1* | 1/2002 | Osamato | ............... | G06T 1/60 348/273 |
| 2002/0012055 A1* | 1/2002 | Koshiba | ............... | G06T 1/60 348/273 |
| 2002/0012398 A1* | 1/2002 | Zhou | ............... | G06T 1/60 375/240.25 |
| 2002/0015447 A1* | 2/2002 | Zhou | ............... | G06T 1/60 375/240.25 |
| 2002/0027604 A1* | 3/2002 | Hung | ............... | G06T 1/60 348/239 |
| 2002/0135683 A1* | 9/2002 | Tamama | ............... | G06T 1/60 348/222.1 |
| 2003/0222998 A1* | 12/2003 | Yamauchi | ............... | G06T 3/4015 348/262 |
| 2004/0155837 A1* | 8/2004 | Yu | ............... | G09G 3/2003 345/63 |
| 2007/0126934 A1* | 6/2007 | Miura | ............... | H04N 9/73 348/655 |
| 2008/0068405 A1* | 3/2008 | Kumakura | ............... | G09G 3/2944 345/690 |
| 2008/0278592 A1* | 11/2008 | Kuno | ............... | H04N 5/332 348/222.1 |
| 2010/0026731 A1* | 2/2010 | Konuma | ............... | G09G 5/04 345/690 |
| 2010/0225571 A1* | 9/2010 | Sakariya | ............... | G09G 3/2011 345/102 |
| 2010/0259551 A1* | 10/2010 | Kao | ............... | G09G 5/02 345/590 |
| 2010/0259686 A1* | 10/2010 | Kao | ............... | H04N 9/73 348/658 |
| 2013/0201224 A1* | 8/2013 | Kang | ............... | H04N 9/73 345/690 |
| 2014/0218411 A1* | 8/2014 | Chen | ............... | G09G 3/3611 345/690 |
| 2015/0229819 A1* | 8/2015 | Rivard | ............... | H04N 5/2354 348/362 |
| 2015/0264273 A1* | 9/2015 | Feder | ............... | H04N 5/35554 348/239 |
| 2015/0350516 A1* | 12/2015 | Rivard | ............... | H04N 5/2355 348/229.1 |
| 2016/0092472 A1* | 3/2016 | Feder | ............... | G06F 16/51 382/306 |
| 2016/0110168 A1* | 4/2016 | Feder | ............... | G06F 8/34 717/106 |
| 2016/0139774 A1* | 5/2016 | Rivard | ............... | G06F 3/04842 715/781 |
| 2016/0140702 A1* | 5/2016 | Kindle | ............... | G06T 5/009 382/167 |
| 2016/0142610 A1* | 5/2016 | Rivard | ............... | H04N 5/2356 348/239 |
| 2016/0143040 A1* | 5/2016 | Rivard | ............... | H04W 24/08 370/329 |
| 2016/0323518 A1* | 11/2016 | Rivard | ............... | H04N 5/247 |
| 2017/0111625 A1* | 4/2017 | Yao | ............... | G06T 5/00 |

\* cited by examiner

WHITE BALANCE ADJUSTMENT METHODS AND SYSTEMS FOR DISPLAY DEVICES

BACKGROUND OF THE INVENTION

1. Field of the Invention

The present disclosure relates to liquid crystal display technology, and more particularly to a white balance adjustment method and the system for display devices.

2. Discussion of the Related Art

Liquid Crystal Display (LCD) is an ultra-thin flat display device, which consists of a plurality of color or monochrome pixels, placed in front of the light source or a reflector. The power consumption of LCD is very low, and the LCD is characterized by attributes such as high-quality, small size, light weight, and thus the LCDs have been the main trend of display devices.

GAMMA reference voltage generation circuit is a key component of LCD, which plays an important role of grayscale adjustment of LCDs. The GAMMA reference voltage generation circuit configures the GAMMA reference voltage in accordance with a required GAMMA curve, and the GAMMA reference voltage is adopted to display the grayscale of the LCD. The GAMMA reference voltage is inputted to the signal driving circuit of the LCD, and is passed through the digital-to-analog (DAC) converter of the signals driving circuit to generate grayscale voltages, such that the grayscale and the curve of the transmission rate of the LCD comply to the required GAMMA curve. FIG. 1 is a schematic view of the conventional GAMMA reference voltage generation module for seven pairs of tie-points, wherein only three pairs of the tie-points are shown. As shown, tie-point GMA1 and GMA14, GMA2 and GMA 13, and GMA8 and GMA 9 respectively relate to one pair. By controlling the voltage of the 7 pairs of tie-points, the serial structure of the internally fixed resistors are configured to divide the voltage for each of the grayscales, and the voltage is outputted by the DAC converter 1 and an output buffer 2. Each pairs of the tie-points include the GAMMA voltage of positive polarity and negative polarity. These two GAMMA voltages, i.e., V0~V255 and V0' ~V155', are symmetrical with respect to a common voltage (Vcom).

When there are big change occurs in the mass production, the brightness regarding a portion of the grayscales may deviate from the standard value. Thus, the tie-point voltage of the GAMMA reference voltage generation module has to be adjusted to form a new grayscale voltage so as to meet the brightness demand. However, such method may introduce new issues. For instance, the GAMMA voltage is adjusted according to the brightness without considering the white balance issue. Also, the ratios of the grayscale to the divided voltage with respect to the red, green, and blue colors are not considered. This may lead to drifting color. Specifically, referring to FIGS. 2-4, FIG. 2 is a curve diagram showing an initial white balance look-up table (LUT), wherein the x-axis relates to the grayscale (n) of the corresponding inputted signals, and the y-axis relates to the real grayscale, including Rn, Gn, and Bn, outputted by the three colors. FIG. 3 is a curve diagram showing the transformation from the real grayscales of the RGB colors of FIG. 2 into the corresponding grayscale voltages. In FIG. 3, the x-axis relates to the grayscale (n) of the corresponding input signals, and the y-axis relates to the grayscale voltage $V_{Rn}$, $V_{Gn}$, and $V_{Bn}$ outputted by the corresponding RGB colors.

FIG. 4 shows the change of the grayscale voltage $V_{Rn}$, $V_{Gn}$, and $V_{Bn}$ when the GAMMA tie-point voltage has changed. Taking the increasing tie-point voltage $V_a$ and $V_b$ as one example, the grayscale voltage $V_{Rn}$, $V_{Gn}$, and $V_{Bn}$ between the $V_a$ and $V_b$ are respectively increased to be $V_{Rn1}$, and $V_{Gn1}$, and $V_{Bn1}$. However, as the change rate of the grayscale voltages of the RGB colors are different, that is, after the GAMMA voltage is adjusted, $V_{Rn1}:V_{Gn1}:V_{Bn1} \neq V_{Rn}:V_{Gn}:V_{Bn}$. Thus, after the GAMMA voltage is adjusted, the color may drift if the white balance is not adjusted.

SUMMARY

Accordingly, the present disclosure relates to a white balance adjustment method and system for display devices to overcome the drifting color after the GAMMA voltage is adjusted.

In one aspect, a white balance adjustment method for display devices includes: obtaining initial white balance components of each of grayscales respectively for red pixels, green pixels, and blue pixels in accordance with an initial white balance look-up table; obtaining a first relationship curve by fitting the white balance component of the red pixel with the white balance component of the green pixel, and obtaining a second relationship curve by fitting the white balance component of the blue pixel with the white balance component of the green pixel; calculating the adjusted white balance component of the green pixel corresponding to each of the grayscales after the GAMMA voltage is adjusted; substituting the adjusted white balance component of the green pixel into the first relationship curve and the second relationship curve to respectively obtain the adjusted white balance components of the red pixel and the blue pixel of each of the grayscales; and creating a second white balance look-up table according to the adjusted white balance components of the red pixels, the green pixels, and blue pixels.

Wherein the method further includes: in step S101, obtaining the relationship curves n-Rn, n-Gn, and n-Bn between an inputted grayscale and a red pixel outputted grayscale (Rn), a green pixel outputted grayscale (Gn), and a blue pixel outputted grayscale (Bn) in accordance with the initial white balance look-up table; in step S102, transforming the relationship curve (n-Gn) into the relationship curve (n-$V_{Gn}$) between the inputted grayscale (n) and the outputted grayscale voltage ($V_{Gn}$) of the green pixel; in step S103, creating the relationship curve (Rn-Gn) by fitting the red pixel outputted grayscale (Rn) and the green pixel outputted grayscale (Gn) in accordance with the relationship curves n-Rn and n-Gn, and creating the relationship curve (Bn-Gn) by fitting the blue pixel outputted grayscale (Bn) and the green pixel outputted grayscale (Gn) in accordance with the relationship curves n-Bn and n-Gn; in step S104, calculating the outputted grayscale voltage ($V_{Gn}$) of the green pixel corresponding to the inputted grayscales (n) after the GAMMA voltage is adjusted, and obtaining the grayscale (Gn') corresponding to $V_{Gn}'$ from the relationship curve (n-$V_{Gn}$); in step S105, obtaining the grayscales (Gn') and (Bn') corresponding to the grayscale (Gn') from the relationship curves (Rn-Gn) and (Bn-Gn); in step S106, creating a second white balance look-up table, when the grayscales (n) is inputted, the Rn' is adopted as the outputted display grayscale of the red pixel, the Gn' is adopted as the outputted display grayscale of the green pixel, and the Bn' is adopted as the outputted display grayscale of the blue pixel; and wherein the grayscale (n) corresponds to any one of the grayscales of the display device.

Wherein the relationship curves Rn-Gn and Bn-Gn are obtained by polynomial fitting methods.

Wherein a cubic or quartic polynomial fitting method is adopted to obtain the relationship curves Rn-Gn and Bn-Gn.

In another aspect, the method includes: in step S201, obtaining the relationship curves n-Rn, n-Gn, and n-Bn between the inputted grayscales (n) and the red pixel outputted grayscale (Rn), the green pixel outputted grayscale (Gn), and the blue pixel outputted grayscale (Bn) in accordance with the initial white balance look-up table; in step S202, transforming the relationship curve (n-Rn) into the relationship curve (n-$V_{Rn}$) between the inputted grayscale (n) and the outputted grayscale voltage ($V_{Rn}$) of the red pixel, transforming the relationship curve (n-Gn) into the relationship curve (n-$V_{Gn}$) between the inputted grayscale (n) and the outputted grayscale voltage ($V_{Gn}$) of the green pixel, and transforming the relationship curve (n-Bn) into the relationship curve (n-$V_{Bn}$) between the inputted grayscale (n) and the outputted grayscale voltage ($V_{Bn}$) of the blue pixel; in step S203, creating the relationship curve $V_{Rn}$-$V_G$n by fitting the outputted grayscale voltage ($V_{Rn}$) of the red pixel and the outputted grayscale voltage ($V_{Gn}$) of the green pixel in accordance with the relationship curves n-$V_{Rn}$ and n-$V_{Gn}$, and creating the relationship curve $V_{Bn}$-$V_G$n by fitting the outputted grayscale voltage ($V_{Bn}$) of the blue pixel and the outputted grayscale voltage ($V_{Gn}$) of the green pixel in accordance with the relationship curves n-$V_{Bn}$ and n-$V_{Gn}$; in step S204, calculating the outputted grayscale voltage ($V_{Gn'}$) of the green pixel corresponding to the inputted grayscale (n) after the GAMMA voltage is adjusted, and obtaining the corresponding grayscale voltage $V_{Rn}$' and $V_{Bn}$' of the outputted grayscale voltage ($V_{Gn'}$) in accordance with the relationship curves $V_{Rn}$-$V_{Gn}$ and $V_{Bn}$-$V_{Gn}$; in step S205, obtaining the grayscale (Rn') corresponding to the $V_{Rn}$' from the relationship curve n-$V_{Rn}$, obtaining the grayscale (Gn') corresponding to the $V_{Gn}$' from the relationship curve n-$V_{Gn}$, and obtaining the grayscale (Bn') corresponding to the $V_{Bn}$' from the relationship curve n-$V_{Bn}$; in step S206, creating a second white balance look-up table, when the grayscale (n) is inputted, the Rn' is adopted as the outputted display grayscale of the red pixel, the Gn' is adopted as the outputted display grayscale of the green pixel, and the Bn' is adopted as the outputted display grayscale of the blue pixel; and wherein the grayscale (n) corresponds to any one of the grayscales of the display device.

Wherein the relationship curves $V_{Rn}$-$V_{Gn}$ and $V_{Bn}$-$V_{Gn}$ are obtained by polynomial fitting methods.

Wherein a cubic or quartic polynomial fitting method is adopted to obtain the relationship curves $V_{Rn}$-$V_{Gn}$ and $V_{Bn}$-$V_{Gn}$.

Wherein the inputted grayscales (n) is in a range from 0 to 255.

In another aspect, a white balance adjustment system for adjusting a white balance of display device, the system includes: a white balance creation module stored with an initial white balance look-up table in advance, the white balance creation module creates a second white balance look-up table according to white balance components of red pixels, green pixels, and blue pixels being adjusted by the white balance component adjustment module; a white balance component obtaining module obtains the initial white balance components of the red pixels, the green pixels, and the blue pixels for each of grayscales according to the white balance component look-up table stored in the white balance creation module; a data curve fitting module creates a first relationship curve by fitting the white balance components of the red pixels and the green pixels and creates a second relationship curve by fitting the white balance components of the blue pixels and the green pixels in accordance with the initial white balance components of the red pixels, the green pixels, and the blue pixels; and a white balance component adjustment module calculates the adjusted white balance components of the green pixel according to the adjusted GAMMA voltage, and substitutes the adjusted white balance components of the green pixel into the first relationship curve and the second relationship curve to respectively obtain the white balance components of the red pixels and the blue pixels of each of the grayscales.

In view of the above, the white balance adjustment method includes the following steps. First, obtaining initial white balance components of each of grayscales respectively for red pixels, green pixels, and blue pixels in accordance with an initial white look-up table (LUT). Second, obtaining a first relationship curve by fitting the white balance component of the red pixel with the white balance component of the green pixel, and obtaining a second relationship curve by fitting the white balance component of the blue pixel with the white balance component of the green pixel. Third, after the GAMMA voltage is adjusted, calculating the adjusted white balance component of the green pixel corresponding to each of the grayscales. The white balance component of the green pixel is taken as the reference. The adjusted white balance components of the red pixel and the blue pixel for each of the grayscales may be respectively obtained by the first relationship curve and the second relationship curve so as to create a second white balance look-up table. As such, the component ratios of the red, green, and blue may be the same or may be close to the adjusted component ratios of the red, green, and blue. In this way, the color drifting issue caused by the adjusted GAMMA voltage may be overcome. Further, by fitting the data, the data calculation is simplified to enhance the efficiency of the white balance adjustment.

DETAILED DESCRIPTION OF THE EMBODIMENTS

Figure 1:
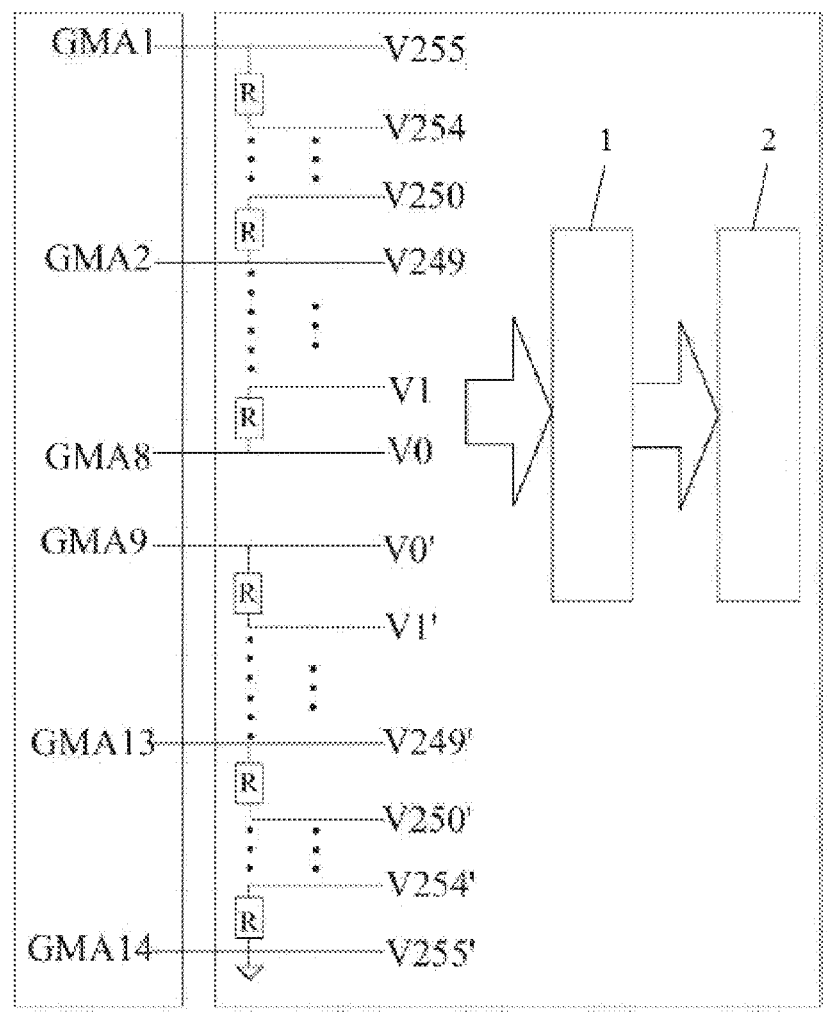
FIG. 1 is a schematic view of the conventional GAMMA reference voltage generation module.

Embodiments of the invention will now be described more fully hereinafter with reference to the accompanying drawings, in which embodiments of the invention are shown.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

As discussed above, the present disclosure relates to a white balance adjustment method and system for display devices to overcome the drifting color after the GAMMA voltage is adjusted.

Figure 5:
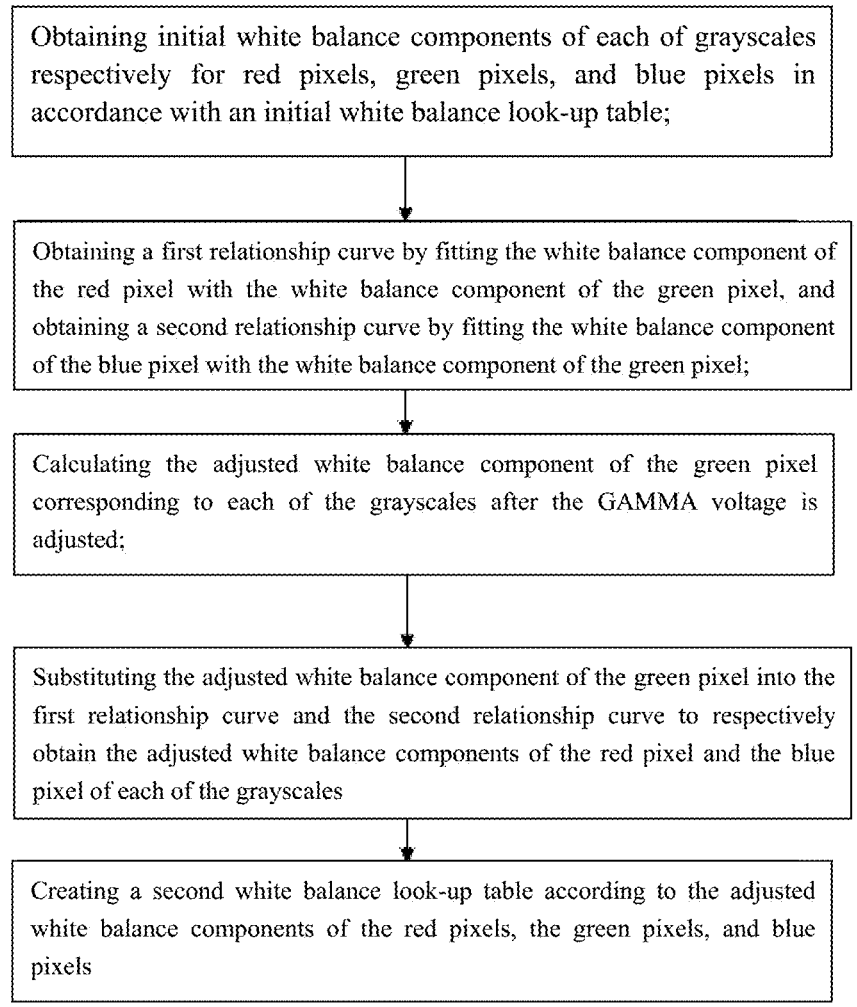
FIG. 5 is a flowchart illustrating the white balance adjustment method for display device in accordance with one embodiment.

FIG. 5 is a flowchart illustrating the white balance adjustment method for display device in accordance with one embodiment. The method includes the following steps.

First, obtaining initial white balance components of each of grayscales respectively for red pixels, green pixels, and blue pixels in accordance with an initial white look-up table (LUT).

Second, obtaining a first relationship curve by fitting the white balance component of the red pixel with the white balance component of the green pixel, and obtaining a second relationship curve by fitting the white balance component of the blue pixel with the white balance component of the green pixel.

Third, after the GAMMA voltage is adjusted, calculating the adjusted white balance component of the green pixel corresponding to each of the grayscales.

Fourth, the adjusted white balance component of the green pixels is substituted into the first relationship curve and the second relationship curve to respectively obtain the adjusted white balance components of the red pixels and the blue pixels of each of the grayscales.

Fifth, creating a second white balance look-up table according to the adjusted white balance components of the red pixels, the green pixels, and blue pixels.

The display device after being adjusted by the white balance component adjustment method may be driven by the second white balance look-up table to display images.

Figure 6:
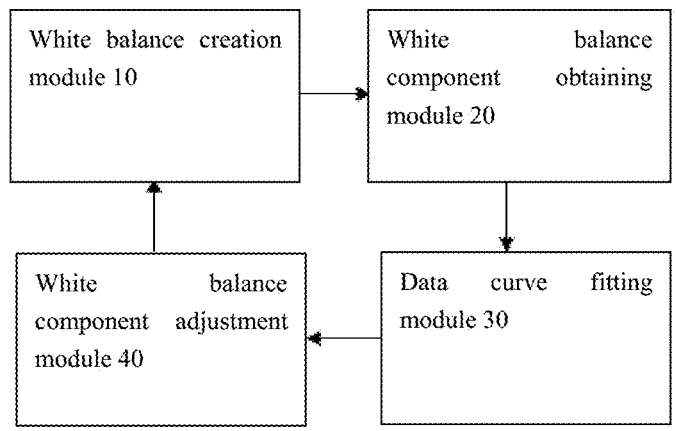
FIG. 6 is a block diagram of the white balance adjustment system for display device in accordance with one embodiment.

As shown in FIG. 6, the white balance adjustment system includes a white balance creation module 10, a white balance component obtaining module 20, a data curve fitting module 30 and a white balance component adjustment module 40.

The white balance creation module 10 is stored with an initial white balance look-up table in advance. The white balance creation module 10 creates a second white balance look-up table according to the white balance components of the red pixels, the green pixels, and the blue pixels adjusted by the white balance component adjustment module 40.

The white balance component obtaining module 20 obtains the initial white balance components of the red pixels, the green pixels, and the blue pixels for each of grayscales according to the white balance component look-up table stored in the white balance creation module 10.

The data curve fitting module 30 creates the first relationship curve by fitting the white balance components of the red pixels and the green pixels and creates the second relationship curve by fitting the white balance components of the blue pixels and the green pixels in accordance with the initial white balance components of the red pixels, the green pixels, and the blue pixels.

The white balance component adjustment module 40 calculates the adjusted white balance components of the green pixel according to the adjusted GAMMA voltage, and substitutes the adjusted white balance components of the green pixel into the first relationship curve and the second relationship curve to respectively obtain the white balance components of the red pixels and the blue pixels of each of the grayscales.

In the first embodiment, the white balance adjustment method of the display devices includes the following steps.

Figure 2:
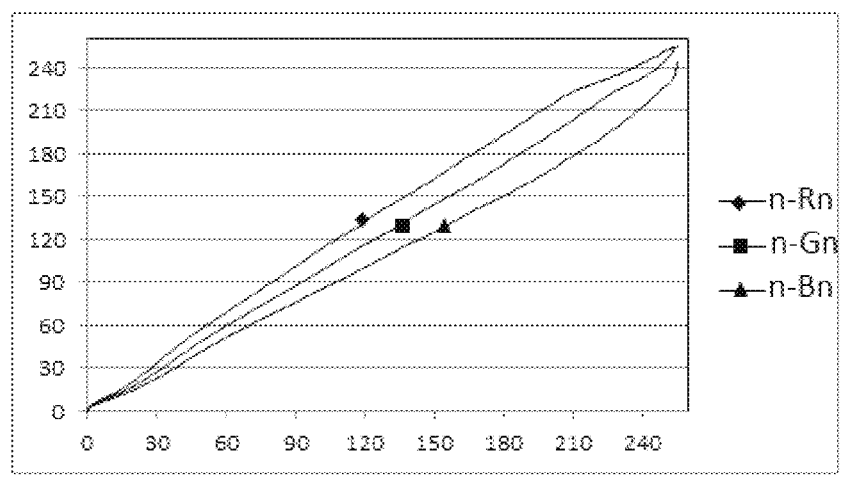
FIG. 2 is a curve diagram showing an initial white balance look-up table (LUT).

In step S101, obtaining the relationship curves n-Rn, n-Gn, and n-Bn between the inputted grayscales (n) and the red pixel outputted grayscale (Rn), the green pixel outputted grayscale (Gn), and the blue pixel outputted grayscale (Bn), as shown in FIG. 2, wherein the initial white balance look-up table is pre-stored in the white balance creation module 10, and the relationship curves n-Rn, n-Gn, and n-Bn are obtained by the white balance component obtaining module 20 in accordance with the white balance look-up table.

Figure 3:
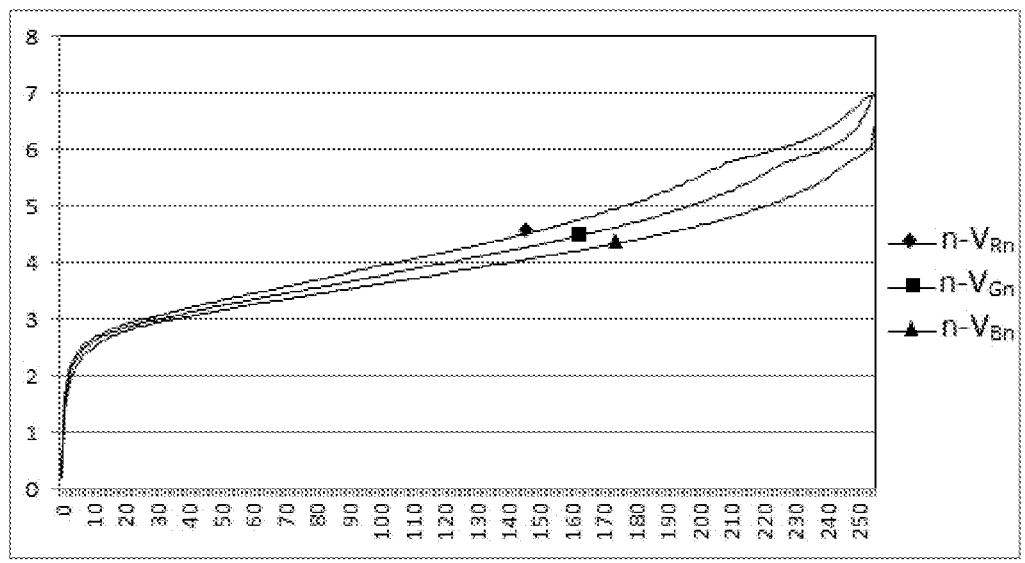
FIG. 3 is a curve diagram showing the transformation from the real grayscales of the RGB colors of FIG. 2 into the corresponding grayscale voltages.

In step S102, the relationship curve (n-Gn) is transformed into the relationship curve (n-$V_{Gn}$) between the inputted grayscales (n) and the outputted grayscale voltage ($V_{Gn}$), wherein the relationship curve (n-$V_{Gn}$) is shown in FIG. 3. The relationship curve (n-$V_{Gn}$) is obtained from transforming the relationship curve (n-Gn) by the white balance component obtaining module 20.

In step S103, creating the relationship curve (Rn-Gn) by fitting the red pixel outputted grayscale (Rn) and the green pixel outputted grayscale (Gn) in accordance with the relationship curves n-Rn and n-Gn, and creating the relationship curve (Bn-Gn) by fitting the blue pixel outputted grayscale (Bn) and the green pixel outputted grayscale (Gn) in accordance with the relationship curves n-Bn and n-Gn, wherein the data curve fitting module 30 creates the relationship curve (Rn-Gn) in accordance with the relationship curves n-Rn and n-Gn, and the data curve fitting module 30 creates the relationship curve (Bn-Gn) in accordance with the relationship curves n-Bn and n-Gn.

Wherein the relationship curves Rn-Gn and Bn-Gn are obtained by polynomial fitting methods, such as cubic or quartic polynomial fitting method. In the embodiment, the quartic polynomial fitting method is adopted to obtain the equation below:

$$f(x)=P_1x^4+P_2x^3+P_3x^2+P_4x+P_5 \quad (1);$$

Figure 7:
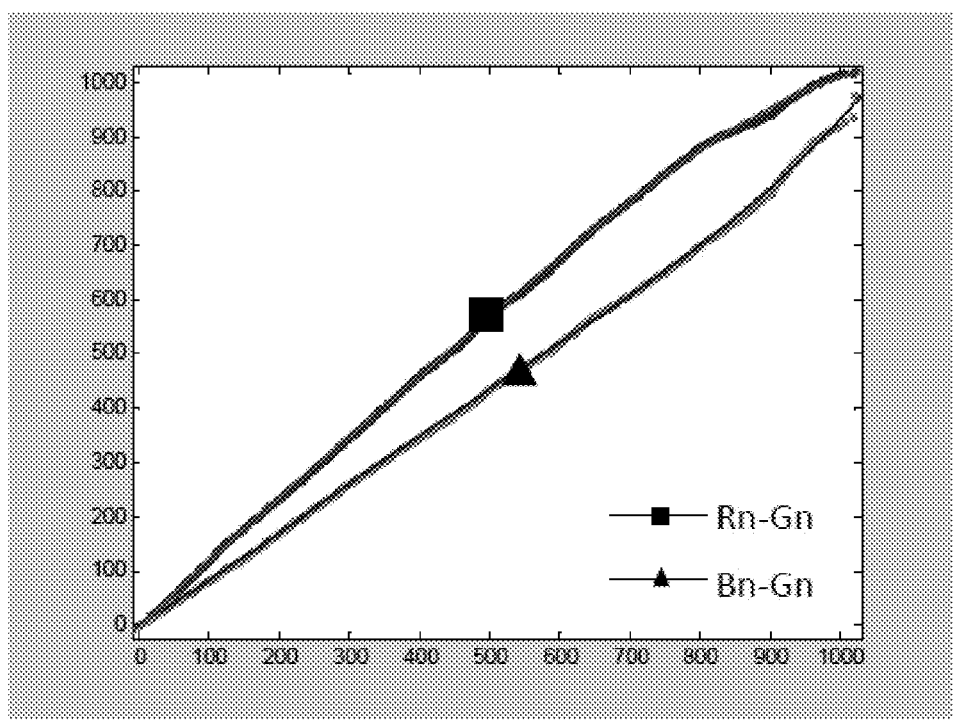
FIG. 7 is a curve diagram showing the obtained relationship curve Rn-Gn and Bn-Gn in accordance with the first embodiment.

In equation (1), with respect to the relationship curve (Rn-Gn), x=Gn, f(x)=Rn. At this moment, $P_1$=−6.206e-010, $P_2$=8.967e-007, $P_3$=−0.0005231, $P_4$=1.259, and $P_5$=−2.034. With respect to the relationship curve (Bn-Gn), x=Gn, f(x)=Bn. At this moment, $P_1$=8.074e-010, $P_2$=−1.329e-006, $P_3$=0.0007107, $P_4$=0.7404, and $P_5$=3.175. The relationship curve (Rn-Gn) and the relationship curve (Bn-Gn) are shown in FIG. 7.

In step S104, after the GAMMA voltage is adjusted, the outputted grayscale voltage ($V_{Gn}$) of the green pixel corresponding to the inputted grayscales (n) is calculated, and the grayscale (Gn') corresponding to $V_{Gn}$' is obtained from the relationship curve (n-$V_{Gn}$). Specifically, the white balance component adjustment module 40 calculates the outputted grayscale voltage ($V_{Gn}$') and obtains the corresponding grayscale (Gn'). The outputted grayscale voltage ($V_{Gn}$') may be obtained by the method below.

Figure 4:
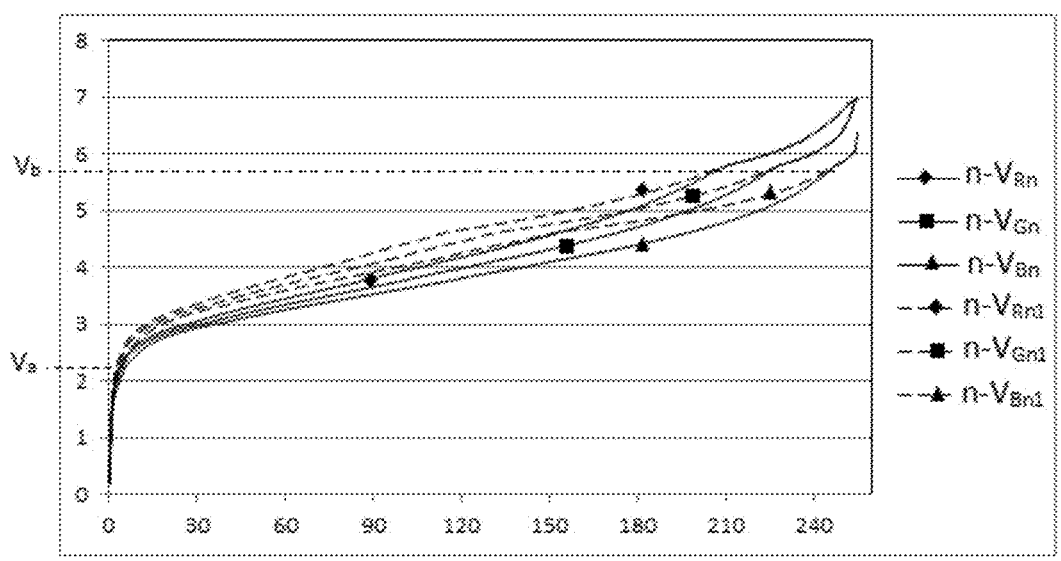
FIG. 4 shows the change of the grayscale voltage when the GAMMA tie-point voltage of FIG. 3 has changed.

Referring to FIG. 4, the grayscale ($n_a$) corresponds to the voltage tie-point ($V_a$), and the grayscale ($n_b$) corresponds to the voltage tie-point ($V_b$). if the voltage tie-point ($V_a$) and the voltage tie-point ($V_b$) are respectively adjusted to be $V_a$' and $V_b$', the outputted grayscale voltage ($V_{Gn}$) corresponding to the green pixel outputted grayscale (Gn) between two voltage tie-points changes to be $V_{Gn}$', and $$V'_{Gn} = V'_a + \frac{(Gn - Ga) \times (V'_b - V'_a)}{n_b - n_a};\quad(2)$$

In step S105, obtaining the grayscale (Gn') and (Bn') corresponding to the grayscale (Gn') from the relationship curve (Rn-Gn) and (Bn-Gn). Specifically, the white balance component adjustment module 40 obtains the grayscale (Gn') and (Bn') corresponding to the grayscale (Gn') of the relationship curve (Rn-Gn) and (Bn-Gn).

In step 106, creating a second white balance look-up table. When the grayscales (n) is inputted, the Rn' is adopted as the outputted display grayscale of the red pixel, the Gn' is adopted as the outputted display grayscale of the green pixel, and the Bn' is adopted as the outputted display grayscale of the blue pixel. Specifically, the white balance creation module 10 creates the second white balance look-up table in accordance with the Gn' and the Rn' obtained in the steps S104 and S105.

In the above embodiment, the grayscale (n) may correspond to any one of the grayscales of the display device. For instance, with respect to the display device having 256 grayscales, the n may be in the range from 0 to 255.

In view of the above, the relationship curves Rn-Gn and Bn-Gn are obtained by looking up the initial white balance look-up table. After the GAMMA voltage is adjusted, the changed grayscale (Gn') is taken as the reference, and the red grayscale (Rn') and the blue grayscale (Bn') are determined in accordance with the curves Rn-Gn and Bn-Gn. As such, the component ratios of the red, green, and blue may be the same or may be close to the adjusted component ratios of the red, green, and blue. In this way, the color drifting issue caused by the adjusted GAMMA voltage may be overcome.

According to general optical principles, with respect to the same grayscale, the brightness of green is greater than the brightness of red, and the brightness of red is greater than the brightness of blue. Thus, by selecting the parameters of the green pixel as the reference, not only the calculation complexity is reduced, the precision is also enhanced.

In the second embodiment, the white balance adjustment method of the display devices includes the following steps.

In step S201, obtaining the relationship curves n-Rn, n-Gn, and n-Bn between the inputted grayscales (n) and the red pixel outputted grayscale (Rn), the green pixel outputted grayscale (Gn), and the blue pixel outputted grayscale (Bn). This step is the same with the first embodiment.

In step S202, transforming the relationship curve (n-Rn) into the relationship curve (n-$V_{Rn}$) between the inputted grayscales (n) and the outputted grayscale voltage ($V_{Rn}$) of the red pixel, transforming the relationship curve (n-Gn) into the relationship curve (n-$V_{Gn}$) between the inputted grayscales (n) and the outputted grayscale voltage ($V_{Gn}$) of the green pixel, and transforming the relationship curve (n-Bn) into the relationship curve (n-$V_{Bn}$) between the inputted grayscales (n) and the outputted grayscale voltage ($V_{Bn}$) of the blue pixel, wherein the relationship curves are transformed by the white balance component obtaining module 20 to obtain the curves n-$V_{Rn}$, n-$V_{Gn}$, and n-$V_{Bn}$.

In step S203, creating the relationship curve $V_{Rn}$-$V_G$n by fitting the outputted grayscale voltage ($V_{Rn}$) of the red pixel and the outputted grayscale voltage ($V_{Gn}$) of the green pixel in accordance with the relationship curves n-$V_{Rn}$ and n-$V_{Gn}$, and creating the relationship curve $V_{Bn}$-$V_G$n by fitting the outputted grayscale voltage ($V_{Bn}$) of the blue pixel and the outputted grayscale voltage ($V_{Gn}$) of the green pixel in accordance with the relationship curves n-$V_{Bn}$ and n-$V_{Gn}$, wherein the data curve fitting module 30 creates the relationship curve $V_{Rn}$-$V_G$n in accordance with the relationship curve n-$V_{Rn}$ and n-$V_{Gn}$, and the data curve fitting module 30 creates the relationship curve $V_{Bn}$-$V_{Gn}$, in accordance with the relationship curves n-$V_{Bn}$ and n-$V_{Gn}$.

Wherein the relationship curves $V_{Rn}$-$V_{Gn}$ and $V_{Bn}$-$V_{Gn}$ are obtained by polynomial fitting methods, such as cubic or quartic polynomial fitting method. In the embodiment, the quartic polynomial fitting method is adopted to obtain the equation below:

In step S204, after the GAMMA voltage is adjusted, the outputted grayscale voltage ($V_{Gn'}$) of the green pixel corresponding to the inputted grayscales (n) is calculated, and the corresponding grayscale voltage $V_{Rn}$' and $V_{Bn}$' of the outputted grayscale voltage ($V_{Gn'}$) is obtained in accordance with the relationship curves $V_{Rn}$-$V_{Gn}$ and $V_{Bn}$-$V_{Gn}$. The $V_{Gn}$' may be calculated by the method in the first embodiment.

In step S205, obtaining the grayscale (Rn') corresponding to the $V_{Rn}$' from the relationship curve n-VR, obtaining the grayscale (Gn') corresponding to the $V_{Gn}$' from the relationship curve n-$V_{Gn}$, and obtaining the grayscale (Bn') corresponding to the $V_{Bn}$' from the relationship curve n-$V_{Bn}$. The white balance component adjustment module 40 obtains the grayscale (Rn'), (Gn') and (Bn') from the relationship curves n-VR, n-$V_{Gn}$, and n-$V_{Bn}$.

In step S206, creating a second white balance look-up table. When the grayscale (n) is inputted, the Rn' is adopted as the outputted display grayscale of the red pixel, the Gn' is adopted as the outputted display grayscale of the green pixel, and the Bn' is adopted as the outputted display grayscale of the blue pixel. Specifically, the white balance creation module 10 creates the second white balance look-up table in accordance with the Gn' and the Rn' obtained in the step S205.

In the above embodiment, the grayscale (n) may correspond to any one of the grayscales of the display device. For instance, with respect to the display device having 256 grayscales, the n may be in the range from 0 to 255.

In view of the above, the relationship curves $V_{Rn}$-$V_{Gn}$ and $V_{Bn}$-$V_{Gn}$ are obtained by looking up the initial white balance look-up table. After the GAMMA voltage is adjusted, the changed grayscale (Gn') is taken as the reference, and the red grayscale (Rn') and the blue grayscale (Bn') are determined in accordance with the curves $V_{Rn}$-$V_{Gn}$ and $V_{Bn}$-$V_{Gn}$. As such, the component ratios of the red, green, and blue may be the same or may be close to the adjusted component ratios of the red, green, and blue. In this way, the color drifting issue caused by the adjusted GAMMA voltage may be overcome.

In view of the above, the white balance adjustment method includes the following steps. First, obtaining initial white balance components of each of grayscales respectively for red pixels, green pixels, and blue pixels in accordance with an initial white look-up table (LUT). Second, obtaining a first relationship curve by fitting the white balance component of the red pixel with the white balance component of the green pixel, and obtaining a second relationship curve by fitting the white balance component of the blue pixel with the white balance component of the green pixel. Third, after the GAMMA voltage is adjusted, calculating the adjusted white balance component of the green pixel corresponding to each of the grayscales. The white balance component of the green pixel is taken as the reference. The adjusted white balance components of the red pixel and the blue pixel for each of the grayscales may be respectively obtained by the first relationship curve and the second relationship curve so as to create a second white balance look-up table. As such, the component ratios of the red, green, and blue may be the same or may be close to the adjusted component ratios of the red, green, and blue. In this way, the color drifting issue caused by the adjusted GAMMA voltage may be overcome. Further, by fitting the data, the data calculation is simplified to enhance the efficiency of the white balance adjustment.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A white balance adjustment method for display devices, comprising:
   in step S11, obtaining initial white balance components of each grayscale respectively for red pixels, green pixels, and blue pixels in accordance with an initial white balance look-up table;
   in step S12, obtaining a first relationship curve by fitting an obtained initial white balance component of the red pixel with an obtained initial white balance component of the green pixel, and obtaining a second relationship curve by fitting an obtained initial white balance component of the blue pixel with the obtained initial white balance component of the green pixel;
   in step S13, calculating an adjusted white balance component of the green pixel corresponding to each of the grayscales after a GAMMA voltage is adjusted;
   in step S14, substituting the adjusted white balance component of the green pixel into the first relationship curve and the second relationship curve to respectively obtain adjusted white balance components of the red pixel and the blue pixel for each of the grayscales; and
   in step S15, creating a second white balance look-up table according to the adjusted white balance components of the red pixels, the green pixels, and blue pixels.

2. The white balance adjustment method as claimed in claim 1, wherein the method further comprises:
   in step S101, obtaining relationship curves n-Rn, n-Gn, and n-Bn between an inputted grayscale (n) and a red pixel outputted grayscale (Rn), a green pixel outputted grayscale (Gn), and a blue pixel outputted grayscale (Bn) in accordance with the initial white balance look-up table;
   in step S102, transforming the relationship curve (n-Gn) into a relationship curve (n-$V_{Gn}$) between the inputted grayscale (n) and an outputted grayscale voltage ($V_{Gn}$) of the green pixel;
   in step S103, creating a relationship curve (Rn-Gn) by fitting the red pixel outputted grayscale (Rn) and the green pixel outputted grayscale (Gn) in accordance with the relationship curves n-Rn and n-Gn, and creating a relationship curve (Bn-Gn) by fitting the blue pixel outputted grayscale (Bn) and the green pixel outputted grayscale (Gn) in accordance with the relationship curves n-Bn and n-Gn;
   in step S104, calculating the outputted grayscale voltage ($V_{Gn}$) of the green pixel corresponding to the inputted grayscales (n) after the GAMMA voltage is adjusted, and obtaining a grayscale (Gn') corresponding to $V_{Gn}'$ from the relationship curve (n-$V_{Gn}$);
   in step S105, obtaining grayscales (Rn') and (Bn') corresponding to the grayscale (Gn') from the relationship curves (Rn-Gn) and (Bn-Gn);
   in step S106, creating a second white balance look-up table, when the grayscale (n) is inputted, the Rn' is adopted as an outputted display grayscale of the red pixel, the Gn' is adopted as an outputted display grayscale of the green pixel, and the Bn' is adopted as an outputted display grayscale of the blue pixel; and
   wherein the inputted grayscale (n) corresponds to any grayscale of the display device.

3. The white balance adjustment method as claimed in claim 2, wherein the relationship curves Rn-Gn and Bn-Gn are obtained by polynomial fitting methods.

4. The white balance adjustment method as claimed in claim 2, wherein a cubic or quartic polynomial fitting method is adopted to obtain the relationship curves Rn-Gn and Bn-Gn.

5. The white balance adjustment method as claimed in claim 2, wherein the inputted grayscale (n) is in a range from 0 to 255.

6. The white balance adjustment method as claimed in claim 1, wherein the method further comprises:
   in step S201, obtaining relationship curves n-Rn, n-Gn, and n-Bn between an inputted grayscale (n) and a red pixel outputted grayscale (Rn), a green pixel outputted grayscale (Gn), and a blue pixel outputted grayscale (Bn) in accordance with the initial white balance look-up table;
   in step S202, transforming the relationship curve (n-Rn) into a relationship curve (n-$V_{Rn}$) between the inputted grayscale (n) and an outputted grayscale voltage ($V_{Rn}$) of the red pixel, transforming the relationship curve (n-Gn) into a relationship curve (n-$V_{Gn}$) between the inputted grayscale (n) and an outputted grayscale voltage ($V_{Gn}$) of the green pixel, and transforming the relationship curve (n-Bn) into a relationship curve (n-$V_{Bn}$) between the inputted grayscale (n) and an outputted grayscale voltage ($V_{Bn}$) of the blue pixel;
   in step S203, creating a relationship curve $V_{Rn}$-$V_{Gn}$ by fitting the outputted grayscale voltage ($V_{Rn}$) of the red pixel and the outputted grayscale voltage ($V_{Gn}$) of the green pixel in accordance with the relationship curves n-$V_{Rn}$ and n-$V_{Gn}$, and creating a relationship curve $V_{Bn}$-$V_{Gn}$ by fitting the outputted grayscale voltage ($V_{Bn}$) of the blue pixel and the outputted grayscale voltage ($V_{Gn}$) of the green pixel in accordance with the relationship curves n-$V_{Bn}$ and n-$V_{Gn}$;
   in step S204, calculating an outputted grayscale voltage ($V_{Gn}'$) of the green pixel corresponding to the inputted grayscale (n) after the GAMMA voltage is adjusted, and obtaining corresponding grayscale voltages $V_{Rn}'$ and $V_{Bn}'$ of the outputted grayscale voltage ($V_{Gn}'$) in accordance with the relationship curves $V_{Rn}$-$V_{Gn}$ and $V_{Bn}$-$V_{Gn}$;

in step S205, obtaining a grayscale (Rn') corresponding to the $V_{Rn}'$ from the relationship curve n-$V_{Rn}$, obtaining a grayscale (Gn') corresponding to the $V_{Gn}'$ from the relationship curve n-$V_{Gn}$, and obtaining a grayscale (Bn') corresponding to the $V_{Bn}'$ from the relationship curve n-$V_{Bn}$;

in step S206, creating a second white balance look-up table, when the grayscale (n) is inputted, the Rn' is adopted as an outputted display grayscale of the red pixel, the Gn' is adopted as an outputted display grayscale of the green pixel, and the Bn' is adopted as an outputted display grayscale of the blue pixel; and wherein the grayscale (n) corresponds to any grayscale of the display device.

7. The white balance adjustment method as claimed in claim 6, wherein the relationship curves $V_{Rn}$-$V_{Gn}$ and $V_{Bn}$-$V_{Gn}$ are obtained by polynomial fitting methods.

8. The white balance adjustment method as claimed in claim 6, wherein a cubic or quartic polynomial fitting method is adopted to obtain the relationship curves $V_{Rn}$-$V_{Gn}$ and $V_{Bn}$-$V_{Gn}$.

9. The white balance adjustment method as claimed in claim 6, wherein the inputted grayscale (n) is in a range from 0 to 255.

* * * * *